(12) United States Patent
Kanka et al.

(10) Patent No.: US 7,931,721 B2
(45) Date of Patent: Apr. 26, 2011

(54) DROPLET SEPARATING SYSTEM

(75) Inventors: Helmut Kanka, Duisburg (DE); Hubert Wolf, Meerbusch (DE); Peter Wandres, Aachen (DE)

(73) Assignee: Munters Euroform GmbH, Aachen (DE)

( * ) Notice: Subject to any disclaimer, the term of this patent is extended or adjusted under 35 U.S.C. 154(b) by 194 days.

(21) Appl. No.: 12/282,355

(22) PCT Filed: Mar. 9, 2007

(86) PCT No.: PCT/DE2007/000430
§ 371 (c)(1),
(2), (4) Date: Jan. 21, 2009

(87) PCT Pub. No.: WO2007/104284
PCT Pub. Date: Sep. 20, 2007

(65) Prior Publication Data
US 2009/0217821 A1  Sep. 3, 2009

(30) Foreign Application Priority Data

Mar. 10, 2006 (DE) .......................... 10 2006 011 185

(51) Int. Cl.
*B01D 50/00* (2006.01)
(52) U.S. Cl. ................. 55/418; 55/443; 55/444; 96/356; 96/358

(58) Field of Classification Search .................... 55/418, 55/443, 444; 96/356, 358
See application file for complete search history.

(56) References Cited

U.S. PATENT DOCUMENTS

| 877,460 A | 1/1908 | Brunner |
| 4,732,585 A | 3/1988 | Lerner |
| 5,749,930 A | 5/1998 | Wolf ............................ 55/242 |
| 2008/0264260 A1 | 10/2008 | Weber |

FOREIGN PATENT DOCUMENTS

| DE | 394895 B | 5/1924 |
| DE | 932403 B | 9/1955 |
| DE | 2260729 B | 1/1975 |
| DE | 8536592 U | 7/1986 |
| DE | 20018970 U | 3/2001 |
| DE | 20302380 | 3/2003 |
| DE | 202005002677 U | 5/2005 |
| JP | 2002228366 A | * 8/2002 |

* cited by examiner

*Primary Examiner* — Robert A Hopkins
(74) *Attorney, Agent, or Firm* — Anndrew Wilford (57) ABSTRACT

The invention relates to a droplet separating system for gas washers and similar, comprising at least one droplet separating layer and a rectifier layer which is arranged upstream in the direction of the flow of gas. The rectifier elements of the rectifier layer are arranged in the form of a V or an upturned V having opposite inclinations to the droplet separating profiles of the droplet separating layer. As a result, the rectifier layer is contaminated in a slow manner due to the increased performance of the droplet separating system.

12 Claims, 7 Drawing Sheets

DROPLET SEPARATING SYSTEM

CROSS REFERENCE TO RELATED APPLICATIONS

This application is the US national phase of PCT application PCT/DE2007/000430, filed 9 Mar. 2007, published 20 Sep. 2007 as WO 2007/104284, and claiming the priority of German patent application 10200601185.0 itself filed 10 Mar. 2006, whose entire disclosures are herewith incorporated by reference.

FIELD OF THE INVENTION

The present invention is directed to a droplet separator arrangement for gas washers etc. with at least one droplet separator layer consisting of at least one row of droplet separator profiles arranged in the form of a V or of a reversed V.

BACKGROUND OF THE INVENTION

Such a droplet separator arrangement is for instance known from DE 195 21 178 02 [U.S. Pat. No. 5,749,930]. According to the known droplet separator arrangement several droplet separator layers are arranged one behind the other in gas flow direction wherein the profiles of the rows arranged one behind the other of the front and rear droplet separator layers are arranged oppositely with respect to one another in gas flow direction. On account of these features the known droplet separator arrangement has an especially good cleaning performance since correspondingly good cleaning effects are generated by the oppositely inclined droplet separator profiles of the adjacent layers by the rinsing liquid flowing away along the profiles.

Furthermore, it is known to use such droplet separator layers (lamella separators) arranged in V-form or in the form of a reversed V in combination with prearranged agglomerators or preseparators forming a flat layer. So, from DE 203 02 380 U1 a combined droplet separator is known consisting of a droplet separator layer in the form a reversed V and consisting of individual lamella profiles and a prearranged flat preseparator layer consisting of tubes or barrels arranged one besides the other in a spaced condition and rotatably supported. The preseparator layer consists of two individual layers spaced from one another in gas flow direction.

Today, more and more higher performance standards are set with respect to such droplet separator arrangements. In other words, such droplet separator arrangements are to be applied with more and more higher flow velocities and are to have a very high separation performance in connection therewith. However, these standards are not always fulfilled by the known droplet separator arrangements consisting of one or more droplet separator layers.

It is the object of the present invention to provide a droplet separator arrangement of the indicated kind which secures a high efficiency and an especially good removal of the liquid (an especially good cleaning behavior).

According to the invention this object is achieved with a droplet separator arrangement of the indicated kind by the features that it includes furthermore at least one flow rectifying layer arranged in front of the droplet separator layer in gas flow direction and consisting of at least one row of tube-like or rod-like rectifying elements arranged one besides the other in a spaced condition, and that the row of the rectifying elements is arranged in the form of V or of a reversed V with opposite inclination with respect to the corresponding row of droplet separator profiles of the droplet separator layer.

Accordingly, the droplet separator arrangement of the invention has a prearranged flow rectifying layer causing a rectification of the gas flow applied to the droplet separator layer in addition to the at least one droplet separator layer in which preferably lamella separators are used. On account of the arrangement of this rectifying layer especially high gas flow velocities can be used which are substantially beyond 5 m/sec. Accordingly, all together the gas flow rate through the droplet separator layer can be increased.

The rectifying layer provided according to the invention consists of at least one row of tube-like or rod-like rectifying elements arranged one besides the other in a spaced condition. The size of these rectifying elements and/or the distance between them is dimensioned such that the same take over (substantially) only a rectifying function and no agglomerator function and/or preseparating function. The special dimensioning of such rectifying elements as well as of the distances between them is known to the expert in the art or can be ascertained by suitable tests.

An essential inventive feature consists in the fact that the row of the rectifying elements in the form of a V or of a reversed V is arranged with opposite inclination with regard to the corresponding row of the droplet separator profiles of the droplet separator layer. The inventors of the present arrangement have ascertained that problems result with a flat arrangement of the rectifying elements in front of a droplet separator layer in V-form or in the form of a reversed V which problems have the result that the rectifying layer can fulfil its function as flow rectifier only insufficiently. The ground for these problems is primarily the fact that the interspaces between the individual rectifying elements are clogged relatively fast with contaminations since they can be cleaned by the provided rinsing systems only insufficiently and that in this manner the water separated by the following droplet separator layer and/or the liquid used for rinsing can no more flow away in a correct manner. Accordingly, the water stemmed on the rectifying layer results in a further deterioration of the flow rectifying effects of the rectifying layer.

In order to overcome these disadvantages the inventors proposed to also design the row of the rectifying elements in the form of a V or of a reversed V (similar to the row of the droplet separator profiles), however, with opposite inclination with respect to the corresponding row of the droplet separator profiles. In this manner an especially good rinsing or cleaning effect of the rectifying elements is obtained since the water flowing along the droplet separator profiles (lamellas) of the droplet separator layer inwardly (to the lowest point of the V) or flowing outwardly on both sides arrives in the middle at the apex of the row of the rectifying elements arranged in the form of a reversed V or arrives outside at the highest points of the legs of the row of rectifying elements arranged in V-form and flows along theses elements to the respective lowest point of the row outwardly or inwardly whereby the rectifying elements are cleaned and a clogging of the intermediate spaces is largely prevented.

Since the flow rectifying elements are tube-like or rod-like elements having no distinct dropping edges it is secured that the water discharged by the droplet separator layer flows nearly over the total length of the V-legs of a row of rectifying elements and thus prevents the contamination of the same nearly over the whole length of the rectifying elements.

Accordingly, the inventive solution results in an increasing efficiency of the droplet separator arrangement by prearrangement of at least one flow rectifying layer and simultaneously provides for a permanent cleaning of the rectifying elements so that the flow rectifying layer gets a long useful life or periodical shutdown times of the arrangement for cleaning can be reduced.

Especially, one succeeds in leading the rinsing water in such a manner that an especially good cleaning effect results by the inventive design of the flow rectifying layer.

According to a further embodiment of the invention the droplet separator layer and the flow rectifying layer are supported at a beam by means of a common support construction. Preferably, the common support construction is a side wall at which the ends of the rectifying elements are fixed or supported and at which the droplet separator profiles (lamellas) are fixed or supported, too. The rectifying elements and the droplet separator profiles can be also combined by means of common side walls to obtain packets wherein these side walls are then fixed or displaceably supported at the common side wall of the support construction. Furthermore, the common side wall of the support construction has a support extending with a right angle herefrom for the support of the arrangement at a fixedly mounted beam. Moreover, a nozzle construction is fixed at the common side wall. Preferably, a connecting rod extends from one beam to the adjacent beam through a corresponding recess in the common side wall and is fixed at the same, too.

The fastening or support of the tube-like or rod-like flow rectifying elements at the common side wall of the support construction can be realized by means of suitable known fastening means, for instance welding, screwing, clamping etc. If the rectifying elements are supported in a movable or limited movable manner at the common side wall corresponding means are provided in order to enable a rotary movement or limited rotary movement.

As regards the design of the flow rectifying elements, the same are preferably formed in a tube-like manner wherein also a corresponding rod-like embodiment (with solid cross-section) is possible. The outer shape of the rectifying elements is not critical per se, however, should favor the achieved cleaning effect by the water flowing down wherein preferably the whole circumference of the rectifying elements should be flown around (avoiding drop edges). Preferably, the rectifying elements are shaped in a circular or oval manner in cross-section. Rectangular or square cross-sectional shapes are possible, too. According to a special embodiment of the invention the rectifying elements are formed in a shell-like manner, especially semicircularly, in cross-section so that they can capture the water flowing down from the droplet separator layer and can discharge the same. However, this embodiment has the disadvantage that here the outside of the flow rectifying elements is not provided with a strong rinsing effect or cleaning effect since the water is captured by the shell and is discharged.

According to still another embodiment according to which the flow rectifying elements are preferably formed as closed tubes the rectifying elements have inlet and outlet openings for the cleaning liquid discharged by the droplet separator layer. According to this embodiment at least part of the cleaning liquid can flow into the interior of the rectifying elements and can be discharged there. This embodiment as well as the embodiment with shell-like cross-section are used especially in a case according to which large amounts of liquid are present which are not completely required for cleaning the rectifying elements.

Another embodiment of the invention provides that the flow rectifying elements are rotatably supported. According to this embodiment the rectifying elements are applied with torques by the gas stream which generate a rotation process of the rectifying elements. These rotation processes can assist in removing contaminations of the rectifying elements (incrustations). According to a special embodiment the rectifying elements are supported in an oscillatory manner so that they can rotate only through a certain angle. Such an oscillating process results in a removal of contaminations, too.

According to the invention the flow rectifying layer can be formed by one layer or several layers of rectifying elements in gas flow direction. If several layers are present the rectifying elements of adjacent layers are preferably arranged offset with respect to one another.

As regards the inclination of the rectifying elements arranged in V-form or in the form of a reversed V (roof-like), the same are preferably inclined with an angle of 10-30°, especially 15°, with respect to a horizontal line. This angle range has shown optimum results with respect to the flow rectifying function and the cleaning function.

According to a special embodiment the droplet separator profiles arranged in V-form and in the form of a reversed V are centrally fastened at a common end wall.

Fundamentally, several droplet separator profiles (lamella profiles) and flow rectifying elements (tube profiles) can be combined by means of common end walls or side walls to obtain packets. These packets can be supported or fastened at the mentioned common support construction or at the above-mentioned common end wall. The support can be realized in such a manner that the end walls or side walls of the packets are displaceably supported in corresponding pockets or receptacles of the support construction or central end wall so that the packets can be exchanged in a relative simple manner without having to dismount the support construction, for example.

BRIEF DESCRIPTION OF THE DRAWING

In the following, the invention is discussed in detail by means of examples in connection with the drawing. Of the drawing

SPECIFIC DESCRIPTION

Figure 1:
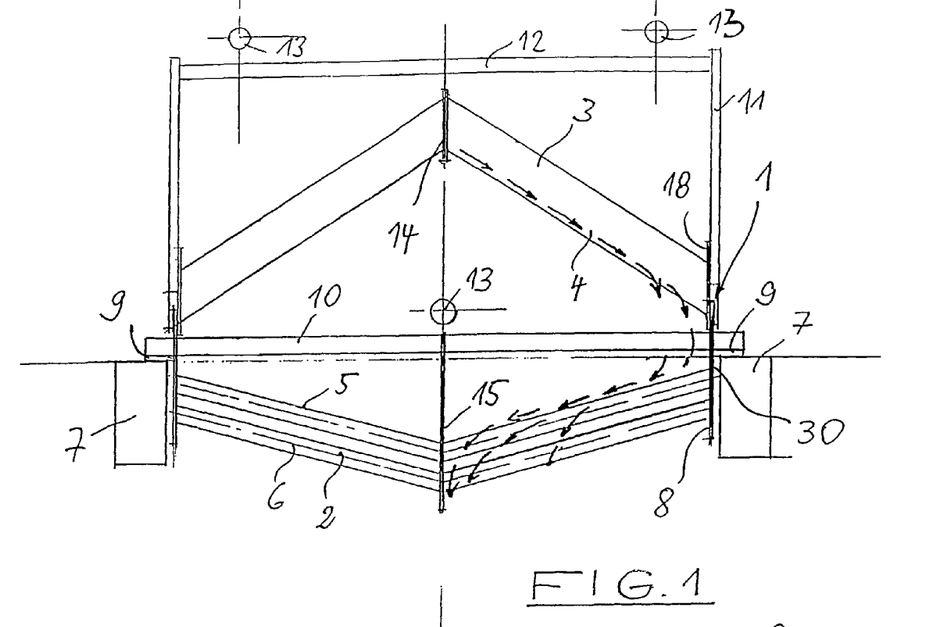
FIG. 1 shows a schematic vertical section through a first embodiment of a droplet separator arrangement.

The droplet separator arrangement 1 schematically shown in FIG. 1 is a droplet separator arrangement of a gas washer. The droplet separator arrangement 1 has a flow rectifying layer 2 and a droplet separator layer 3. This arrangement has the purpose to separate liquid from a gas stream flowing from below to above in the figure, as this is known in the art.

The droplet separator layer 3 is formed as a reversed V or in a roof-like manner and has a plurality of droplet separator profiles 4 designed in lamella-shape which are arranged inclined parallel with respect to one another and between which the gas stream flows through in a wound path so that liquid is separated. As indicated by the arrows in FIG. 1, this liquid flows along the droplet separator profiles 4 sideways downwardly. Several droplet separator profiles 4 are combined by means of corresponding end walls 14 and side walls 18 to obtain packets. These packets are supported with respect to one another through the end walls 14 and are supported at a common support construction 30 by means of the side walls 18, the support construction 30 having another side wall 8, a support 9 for the support at a fixedly installed beam 7 and a connecting rod 10 extending from a beam to the adjacent beam. Furthermore, a nozzle construction is fastened at the common support construction 30 which nozzle construction consists of posts 11, cross rods 12 and nozzles 13. This nozzle construction serves for periodically cleaning the droplet separator arrangement.

The flow rectifying layer 2 consists of two superimposed layers 5, 6 of tube-like flow rectifying elements. The flow rectifying elements are fixed at a common central end wall 15 which is fixed at the connecting rod 10. With their other end the rectifying elements are fixed at the side wall 8 of the common support construction 30, respectively.

As shown in FIG. 1, the flow rectifying layer 2 has the form of a V. The inclination of the rectifying elements 5, 6 with respect to a horizontal line is but smaller than the inclination of the droplet separator profiles 4 and has a value of approximately 15° while the inclination of the droplet separator profiles is approximately 37°.

The arrows shown in FIG. 1 indicate the path of the liquid separated from the droplet separator layer 3 and of the rinsing liquid when the nozzle construction operates. As mentioned above, the liquid flows along the droplet separator profiles 4 downwardly and outwardly in an inclined manner and flows therefrom, as indicated by the arrows, onto the flow rectifying elements 5, 6 disposed thereunder which are flown around on account of their round shape wherein the liquid flows along the tube-like rectifying elements downwardly to the center. There, the liquid drops downwardly from the rectifying layer. By this flow path of the liquid not only the individual droplet separator profiles but also the individual rectifying elements are cleaned so that the rectifying elements can realize their flow rectifying function without the danger of contaminations in a satisfactory manner.

Figure 2:
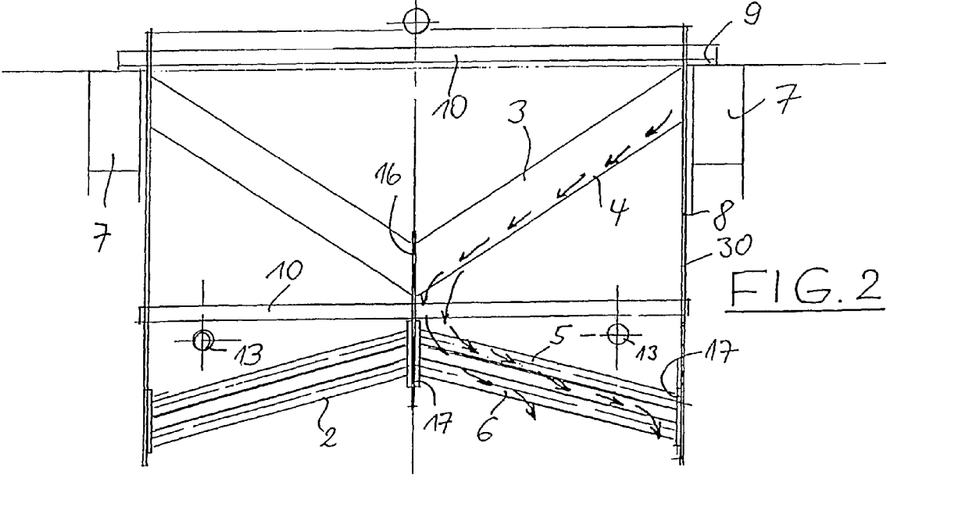
FIG. 2 shows a schematic vertical section through a second embodiment of a droplet separator arrangement.

FIG. 2 shows a corresponding view as FIG. 1 of another embodiment according to which the droplet separator layer is formed as V and the predisposed flow rectifying layer is formed as reversed V. According to this embodiment both layers are supported at a common support construction 30 consisting of a side wall 30, a support 9 extending herefrom with a right angle and two connecting rods 10. A common centrally arranged end wall 16 is provided at which not only the droplet separator profiles 4 are fastened directly but also the rectifying elements are fastened through additional end walls 17. Furthermore, the rectifying elements are fixed at the side wall 8 of the common support construction by means of additional side walls 17 while the droplet separator profiles are directly mounted at the side wall 8.

According to this embodiment the liquid separated by the droplet separator layer or the rinsing liquid flows along the individual droplet separator profiles in FIG. 2 from the outside to the inside and flows from there onto the both layers 5, 6 of the flow rectifying elements, as shown by the arrows. Furthermore, the liquid flows along the rectifying elements to the outside so that the same are cleaned and drops then downwardly from the rectifying elements. Accordingly, a corresponding effect as with the embodiment of FIG. 1 is reached with the difference that in this case the flow direction is opposite.

Figure 3:
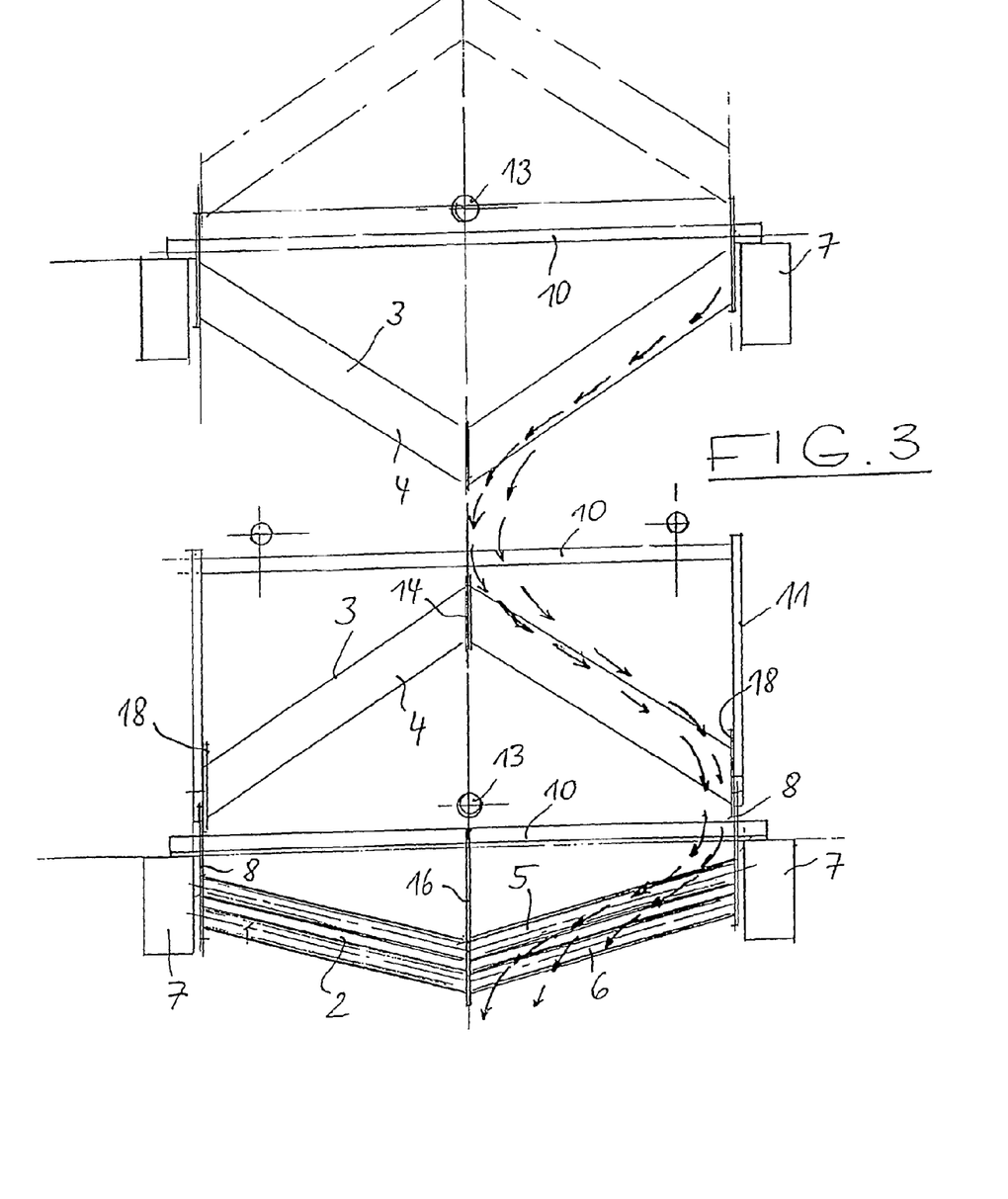
FIG. 3 shows a schematic vertical section through a third embodiment of a droplet separator arrangement.

FIG. 3 shows a corresponding view as FIGS. 1 and 2 wherein according to this embodiment two droplet separator layers 3 are disposed on different beams 7. This embodiment has a flow rectifying layer 2 in gas flow direction which consists of a first and a second layer 5, 6 of flow rectifying elements, a first droplet separator layer 3 and a following second droplet separator layer 3. The rectifying layer 2 has the form of a V, the first droplet separator layer has the form of a reversed V and the second droplet separator layer 3 again has the form of a V. The flow path of the separated liquid and/or the rinsing liquid is indicated by arrows in FIG. 3. Even in this case a comparable rinsing or cleaning effect is achieved by the arrangement of the rectifying elements inclined in V-form.

Figure 4:
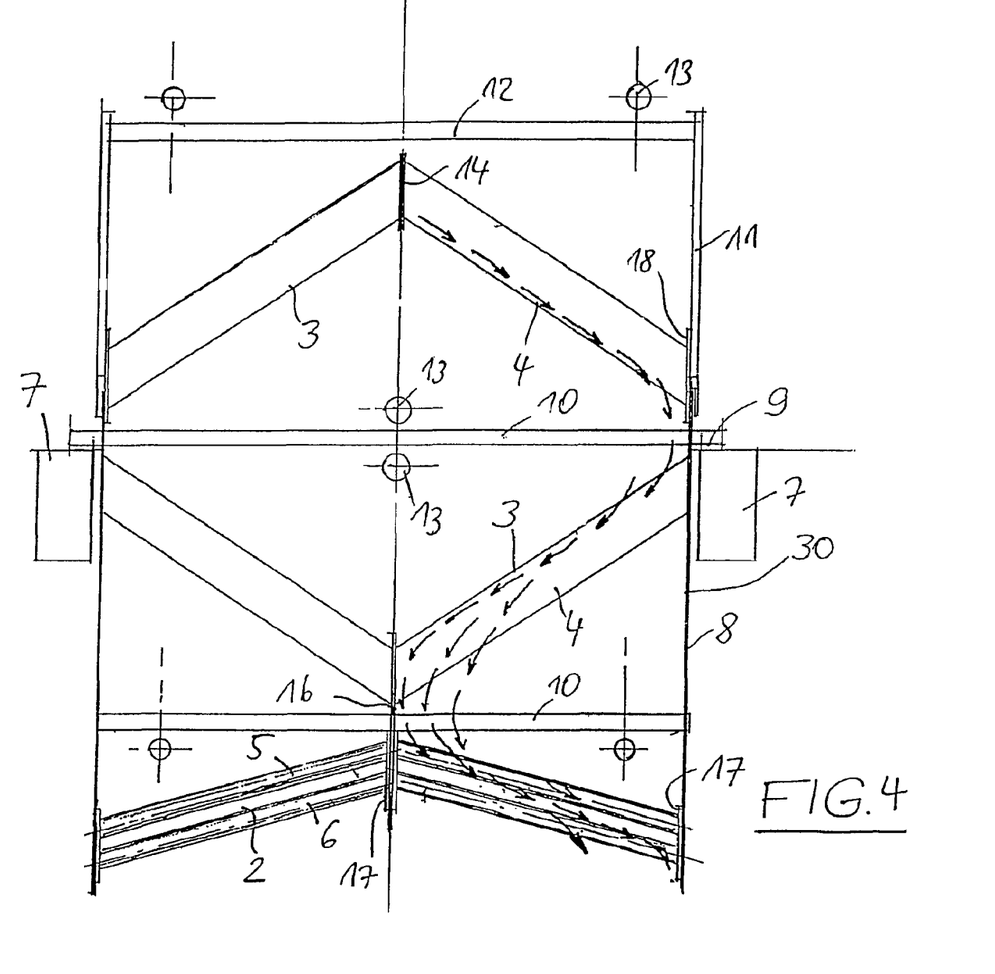
FIG. 4 shows a schematic vertical section through a fourth embodiment of a droplet separator arrangement.

FIG. 4 shows a corresponding view of still another embodiment. According to this embodiment a flow rectifying layer 2 arranged or formed as a reversed V. a following first droplet separator layer 3 arranged or formed in a V-like manner and a following second droplet separator layer in the form of a reversed V have a common support construction 30 with which all the three layers are supported at beams 7. This common support construction 30 has also a side wall 8, a support 9 extending with a right angle herefrom for the support on the beam 7 and two connecting rods 10. The respective droplet separator profiles 4 and flow rectifying elements of the two layers 5, 6 are fixed at the common side wall 8 of the support construction 30 either by means of special side is walls 17, 18 or directly. A common central end wall 16 serves for the fixation of the droplet separator profiles 4 and the flow rectifying elements by means of special end walls 17. Here, the flow path of the separated liquid and/or rinsing liquid is opposite to that of the embodiment of FIG. 3.

Figure 5:
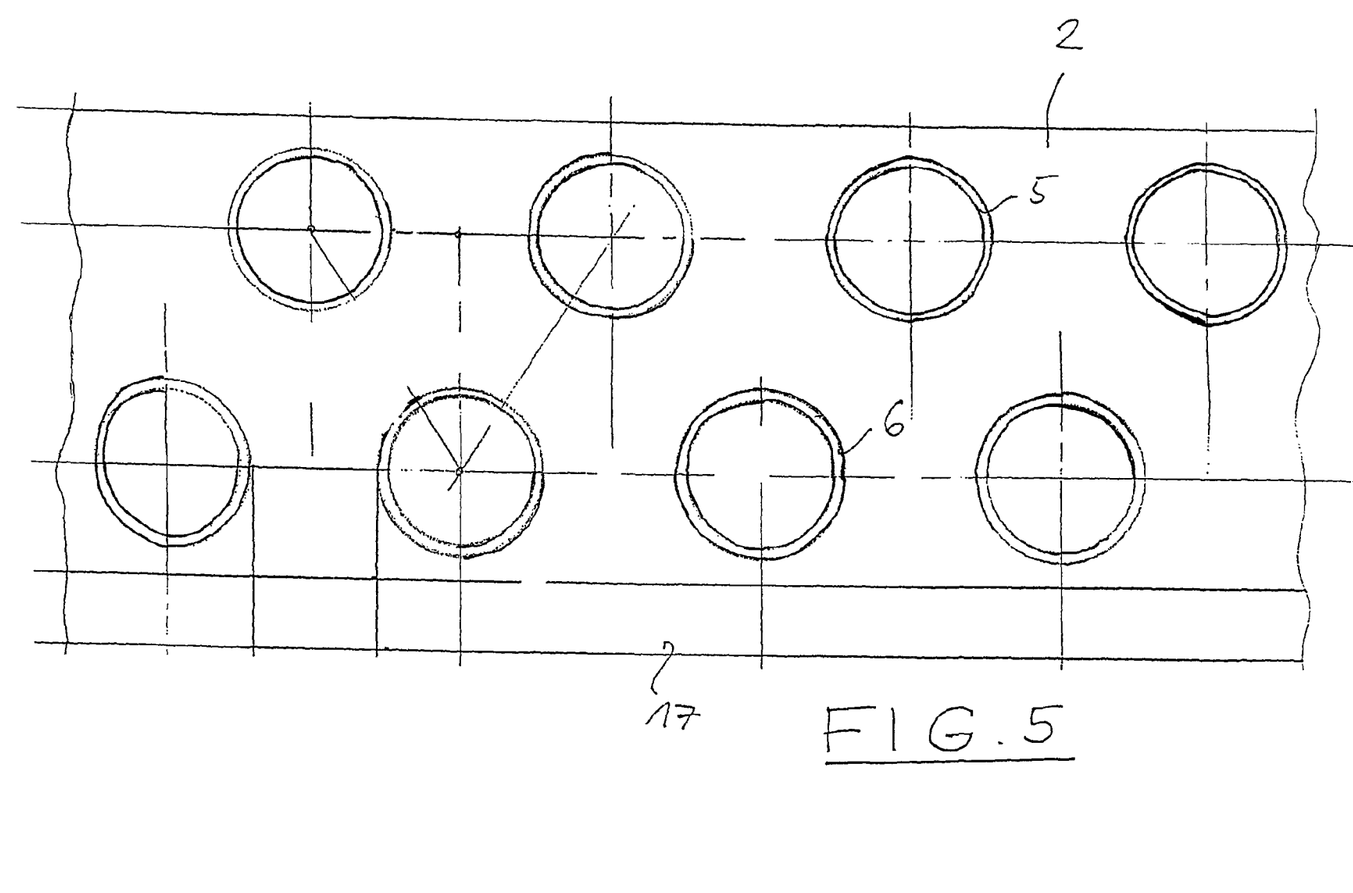
FIG. 5 shows a schematic view of a side wall of a flow rectifying layer.

FIG. 5 shows a part view of a side wall or end wall 17 by means of which the tube-like rectifying elements 5, 6 of the two layers are fixed at a central end wall 16 or the side wall 8 of the common support construction. Here, the gas flow direction extends from below to above in the figure. One recognizes that the tube-like flow rectifying elements 5 of the rear layer in gas flow direction are offset with respect to the tube-like rectifying elements 6 of the first layer, i.e. exactly centrally between two rectifying elements 6 of the first layer. The corresponding distances between the individual rectifying elements as well as their size have to be ascertained empirically by the expert in the art in order to secure a correct flow rectifying function of the rectifying layer.

Figure 6:
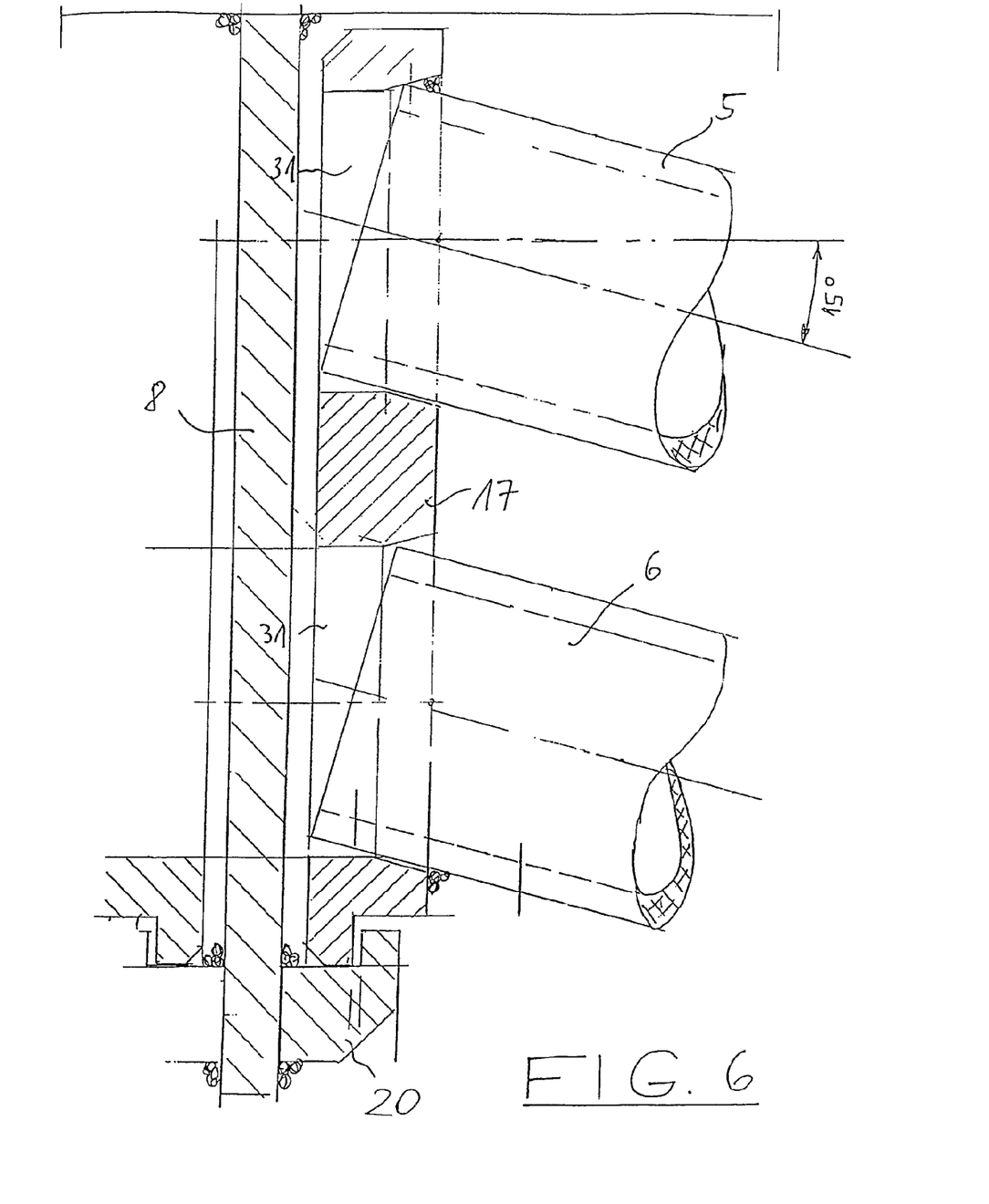
FIG. 6 shows a schematic part vertical section showing the attachment of the flow rectifying elements at a support construction according to a first embodiment.

FIG. 6 shows an example of the installation of the tube-like flow rectifying elements 5, 6 at the side wall 8 of the common support construction. Here, the installation is realized by means of an additional side wall 17 which is supported on a nose 20 welded to the side wall 8. This side wall 17 has corresponding openings for receiving the inclined rectifying elements 5, 6 wherein these openings 31 are conically enlarged in order to enable a smooth contact of the inclined rectifying elements 5, 6. A fixation of the elements in the openings can be done by means of is welding seams.

Figure 7:
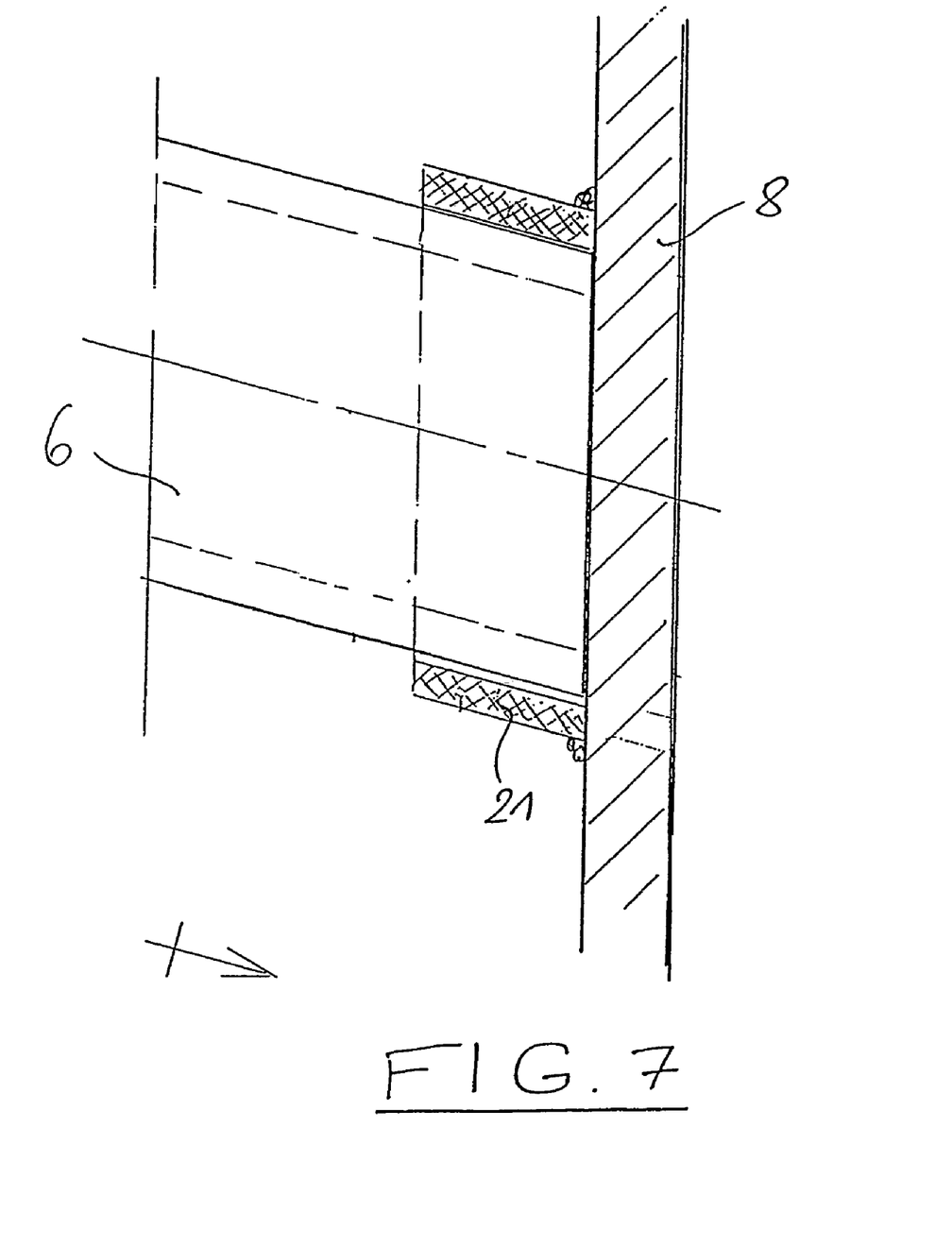
FIG. 7 shows a schematic vertical section showing the attachment of a flow rectifying element at a support construction of a second embodiment.

Another embodiment of the fixation of the flow rectifying elements at the side wall 8 of the common support construction is shown by FIG. 7. In this case the rectifying elements 5, 6 are introduced with their end portions into tubular recesses 21 which are welded to the side wall 8. The recesses 21 take up the ends of the rectifying elements substantially positively.

Figure 8:
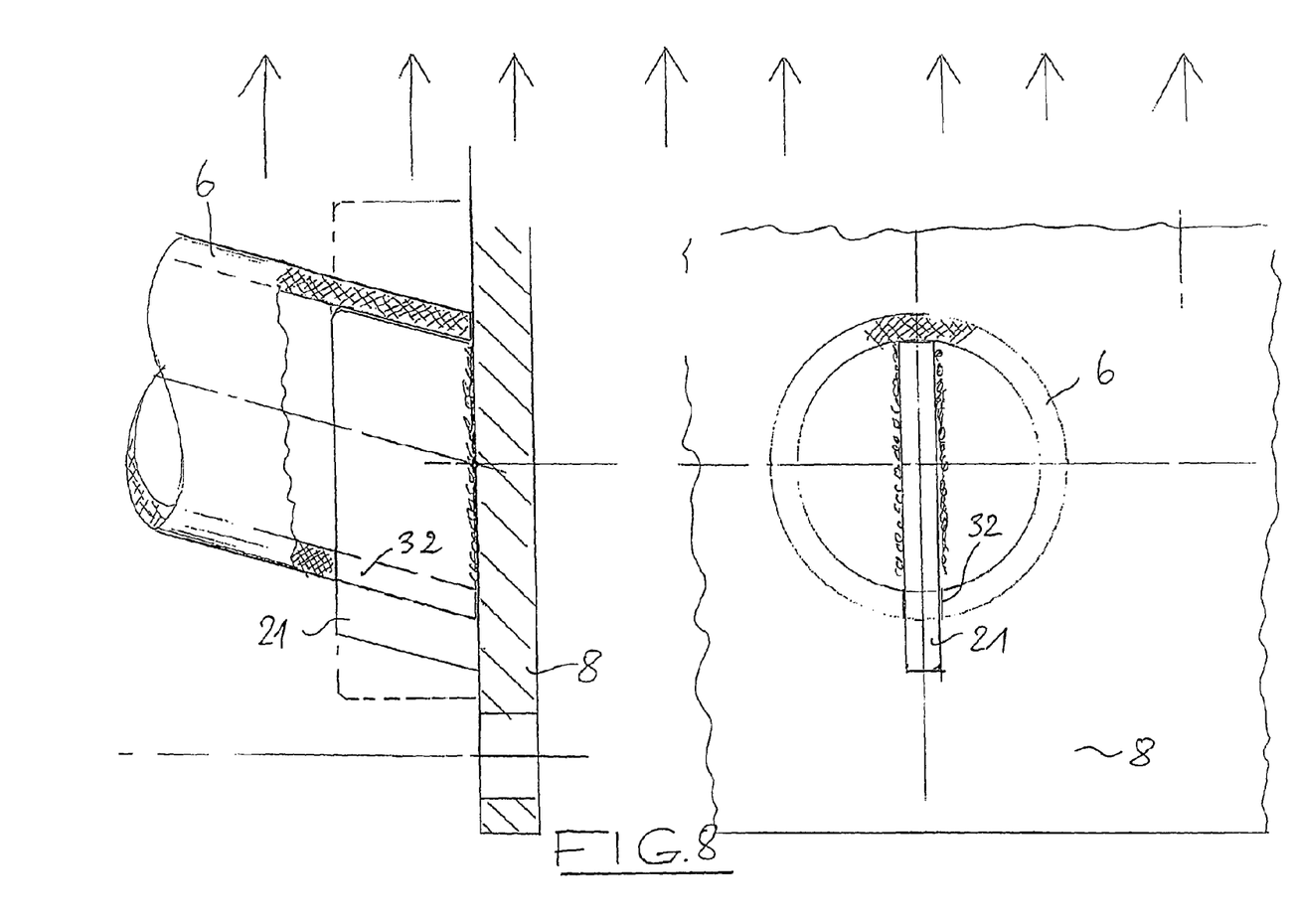
FIG. 8 shows a schematic part vertical section and a view showing the attachment of a flow rectifying element at a support construction according to a third embodiment.

Another kind of fixation is shown in FIG. 8. The left sectional view of FIG. 8 shows that an inwardly projecting plate 21 is welded to the side wall 8 of the common support construction wherein the plate 21 is engaged into a slot 32 formed at the lower side of the tubular rectifying element 6 and holds the rectifying element 6 in this manner. The view shown on the right side of FIG. 8 shows schematically this kind of fixation.

As mentioned above, the flow rectifying elements are formed in a tube-like or rod-like manner wherein they can have the most different cross-sections of which the preferred embodiments have been already mentioned above. It is still to be mentioned that the flow rectifying elements can be also formed in a U-like manner in cross-section or in the form of a reversed U. According to another embodiment the flow rectifying elements have a droplet form in cross-section. Solid or hollow cross-sections can be used.

In the embodiment according to which the flow rectifying elements are supported in an oscillatory manner the rectifying elements can oscillate about their central axis. According to other embodiments they oscillate about eccentrically arranged axes which, for instance, can be arranged in the upper or in the lower range of a rectifying element. In this case the rectifying elements can have upwardly or downwardly projecting portions, for instance, with which a pivotal support is realized.

The invention claimed is:

1. A droplet separator arrangement for gas washers, the droplet separator comprising:
   at least one droplet separator layer consisting of at least one row of droplet separator profiles having the form of a V or of a reversed V; and
   at least one flow rectifying layer arranged in front of the droplet separator layer in gas flow direction, the flow rectifying layer consisting of at least one row of tube-like or rod-like flow rectifying elements arranged one besides the other in a spaced condition, the row of the flow rectifying elements being arranged in the form of a V or of a reversed V with opposite inclination with regard to the corresponding row of droplet separator profiles of the droplet separator layer.

2. The droplet separator arrangement according to claim 1 wherein the droplet separator layer and the flow rectifying layer are supported at a beam by means of a common support construction.

3. The droplet separator arrangement according to claim 1 wherein the flow rectifying elements are formed circularly or ovally in cross-section.

4. The droplet separator arrangement according to claim 1 wherein the flow rectifying elements are rectangularly formed in cross-section.

5. The droplet separator arrangement according to claim 1 wherein the flow rectifying elements are formed in a shell-like, or semicircular, manner in cross-section.

6. The droplet separator arrangement according to claim 1 wherein the flow rectifying elements have inlet and outlet openings for liquid discharged by the droplet separator layer.

7. The droplet separator arrangement according to claim 1 wherein the flow rectifying elements are rotationally supported.

8. The droplet separator arrangement according to claim 1 wherein the flow rectifying elements are supported in an oscillatory manner.

9. The droplet separator arrangement according to claim 1 wherein the flow rectifying layer is formed by several layers of flow rectifying elements in gas flow direction.

10. The droplet separator arrangement according to claim 9 wherein the flow rectifying elements of adjacent layers are offset with respect to one another.

11. The droplet separator arrangement according to claim 1 wherein the flow rectifying elements are inclined with an angle of 10-30° with respect to a horizontal line.

12. The droplet separator arrangement according to claim 1 wherein the droplet separator profiles arranged in the form of a V and the flow rectifying elements arranged in the form of a reversed V are centrally fixed at a common end wall.

* * * * *